June 6, 1950     M. J. SMART ET AL     2,510,525
DEVICE FOR STEERING TOWED EQUIPMENT
Filed Jan. 14, 1948     2 Sheets-Sheet 1
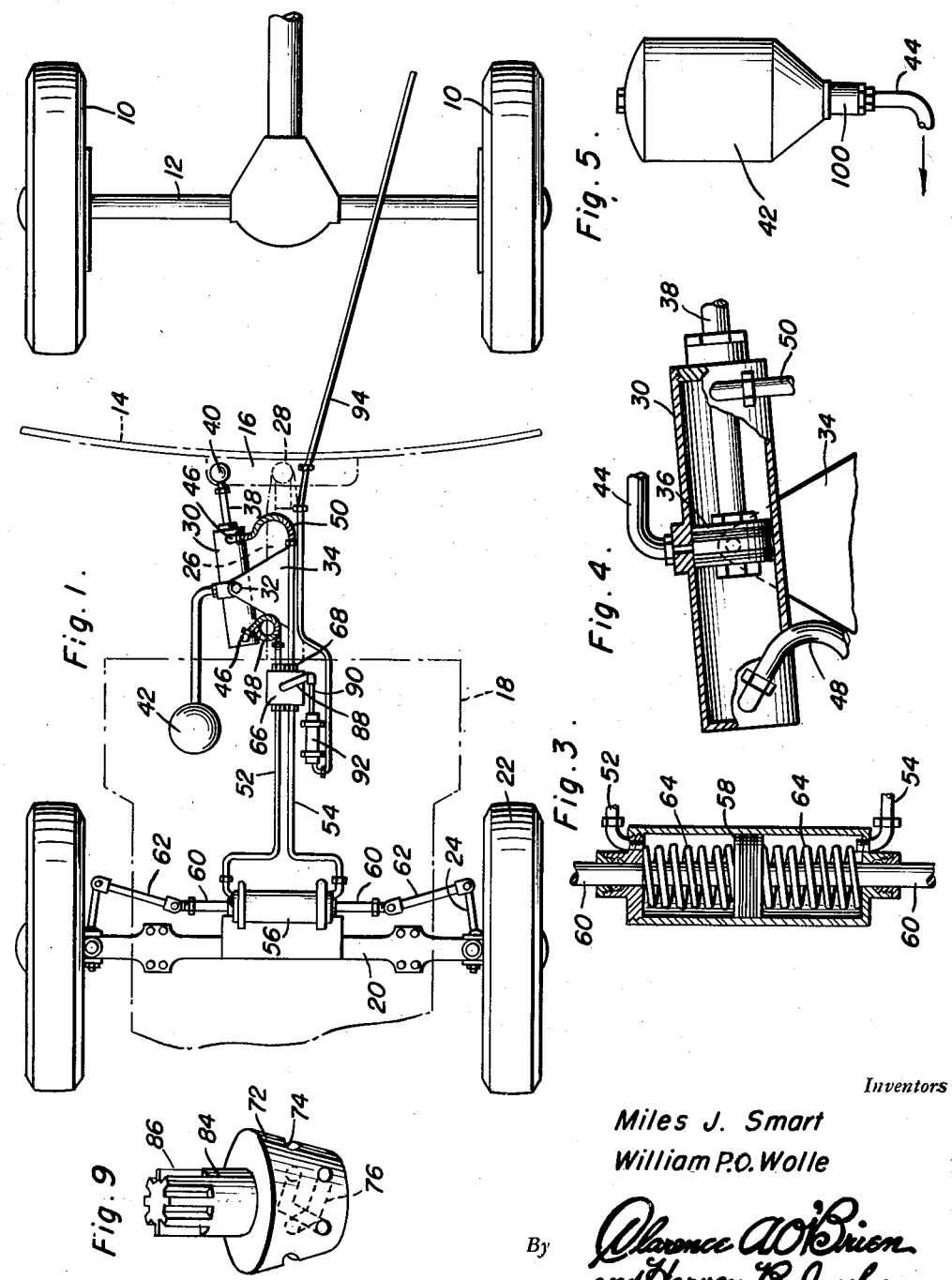
Inventors
Miles J. Smart
William P.O. Wolle
By Clarence A. O'Brien
and Harvey B. Jacobson
Attorneys

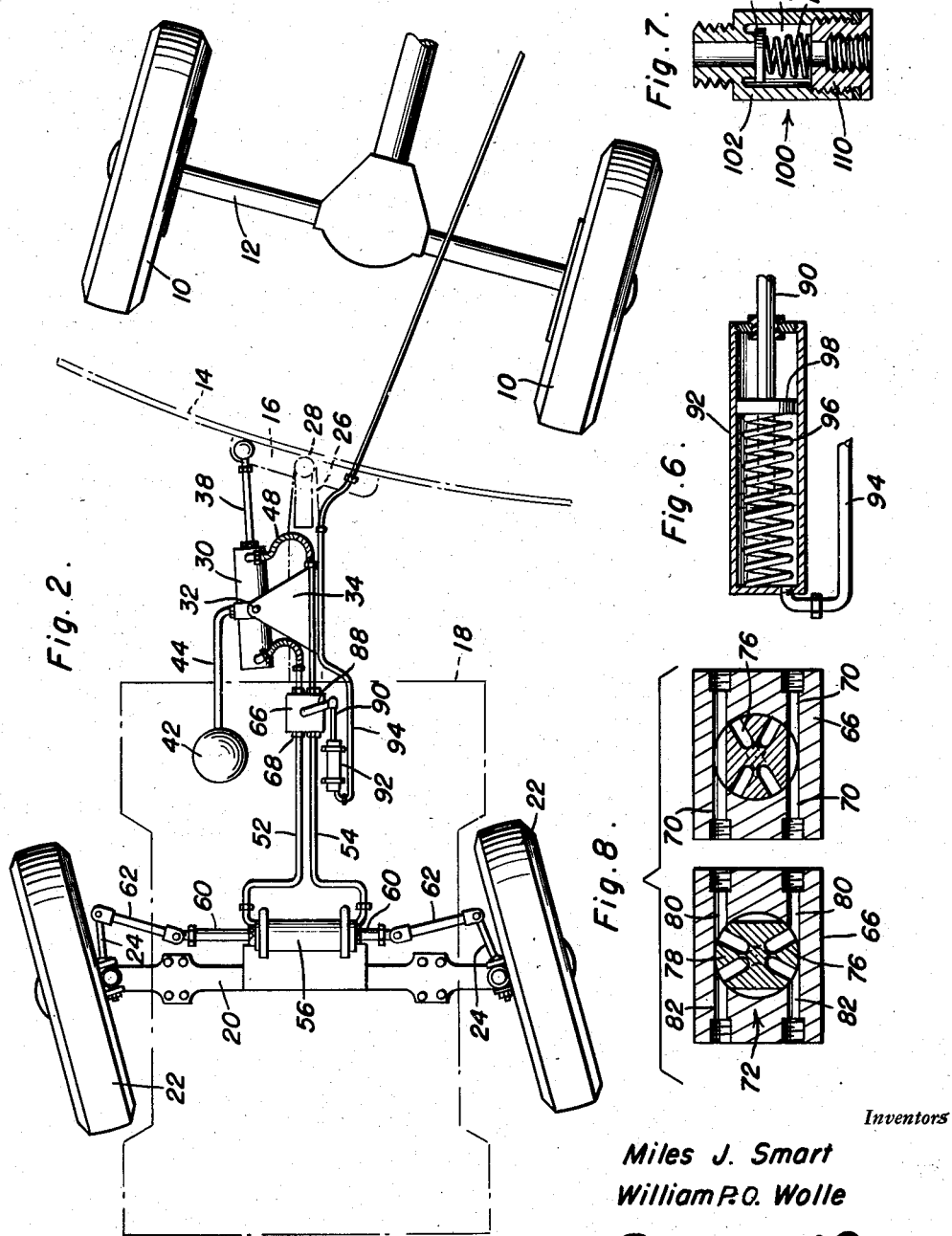

Patented June 6, 1950

2,510,525

UNITED STATES PATENT OFFICE 2,510,525

DEVICE FOR STEERING TOWED EQUIPMENT

Miles J. Smart and William P. O. Wolle, Oklahoma City, Okla.; said Wolle assignor to said Smart Application January 14, 1948, Serial No. 2,278

4 Claims. (Cl. 280—33.55)

This invention relates particularly to steering means for a trailer having pivoted wheels and towed by a tractor, the steering means being of hydraulic type.

A primary object of this invention is to provide means whereby a trailer may be towed, which term will be considered to include house trailers, boat trailers, anti-aircraft guns, artillery and ammunition trailers, as well as farm equipment such as disks, plows, seeders and combines, and road building equipment, and the like. The term "tractor," as used in this specification, will connote any means such as a passenger automobile, truck, tractor or the like.

Another object of this invention is to provide steering means for trailers which can be adapted to cause steering movement of pivoted wheels on a trailer either in the same direction or in the opposite direction, as the tractor is turned relative to the trailer.

Still another object of this invention is to provide remote control means whereby a driver of the tractor may conveniently control the direction in which the pivoted wheels of the trailer will be turned when the tractor is turned relative to the trailer.

Still another object of this invention is to provide means whereby the pivoted wheels of the trailer will be returned to normal position in the event that the hydraulic steering means provided by this invention fails.

Still another object of this invention is to provide certain refinements of construction in the various elements used in carrying out the general principle of operation in automatically steered trailer mechanisms.

And a last object to be mentioned specifically is to provide means of this character which is relatively inexpensive and practicable to manufacture, which is safe, simple, dependable and economical in operation, and which will give generally efficient and durable service.

With these objects definitely in view, together with other objects which will appear hereinafter as this description proceeds, this invention resides in certain novel features of construction, combination and arrangement of parts and elements which will be hereinafter described in the specification, particularly pointed out in the appended claims, and illustrated in the accompanying drawings, which form a material part of this application, and in which:

Figure 1 is a fragmentary plan view showing rear portions of a tractor and front and central portions of a two-wheel trailer, a portion of the body of the trailer being indicated in dash lines, and portions of the tractor also being illustrated in phantom lines;

Figure 2 is a view similar to Figure 1, and showing the positioning of the wheels of the trailer when the tractor is being turned toward the right and the control valve is in one position;

Figure 3 is a horizontal sectional view through the cylinder carried by the undercarriage or axle portions of the trailer and hereinafter referred to as the second cylinder;

Figure 4 is a horizontal sectional view of the cylinder hereinafter referred to as the first cylinder and ordinarily carried on the tongue or tow bar of the towed equipment;

Figure 5 is a side elevational view of the fluid reservoir, the valve associated therewith, and a portion of the pipe connection leading from this valve to the first cylinder;

Figure 6 is a horizontal sectional view of the valve control cylinder;

Figure 7 is a vertical transverse sectional view of the valve illustrated in Figure 5;

Figure 8 is a grouped view, horizontal and sectional in character, showing the control valve structure as positioned for normal and reversed connection of the first and second cylinders; and Figure 9 is a three dimensional view of the plug portion of the control valve and the valve stem used for connection of the valve to a valve handle or control lever.

Similar characters of reference designate similar elements or parts throughout the specification and throughout the several views of the drawings.

Referring now to the drawings in detail, the environment wherewith this invention is adapted to be used includes a tractor of which rear portions are shown in Figures 1 and 2, including the rear wheels of the tractor 10, the rear axle thereof 12, the bumper 14 which is here used as representative of any structure operating as hitch means and carried by the tractor, the drawings illustrating rather diagrammatically a drawbar 16 secured to this bumper 14. The environment will also include a trailer represented in Figures 1 and 2 as including a body 18, axle suspension means 20, ground contacting wheels 22 having steering arms 24, and coupling means represented by the tongue 26, which tongue will ordinarily be connected to the drawbar 16 by a universal joint generally represented at 28. This invention contemplates provision of a first cylinder 30 pivotally mounted at 32 on a pair of bracket plates 34 carried on the tongue 26; or on some other suitable portion of the trailer. The cylinder 30 is thus mounted for pivotal movement in a substantially horizontal plane, and a piston 36 in this first cylinder carries a piston rod 38 which is pivotally connected at 40 to the drawbar 16 in spaced relation to the universal joint 28, that is, spaced horizontally therefrom.

The first cylinder 30 is supplied with suitable fluid from a reservoir 42, preferably carried on the trailer, the mounting thereof being immaterial in this application, and connected to the cylinder 30 by means of a pipe 44 and suitable nipples.

Each end of the cylinder 30 is provided with an elbow 46, connected by flexible tubes 48 and 50, to inflexible tubes 52 and 54 leading to different ends of the second cylinder 56, which is rigidly mounted upon the axle suspension means 20 or on any other suitable portion of the trailer. Obviously, the details of this portion of the apparatus may be varied according to the type of equipment wherewith this invention is used.

The second cylinder 56 has a single piston 58 and two piston rods 60 operatively connected to the steering arms 24 by means of inflexible link members 62, and it should be particularly noted that a pair of springs 64 are compressed between the ends of the second cylinder 56 and the piston 58, for the purpose of returning the wheels 22 to normal positions in the event of failure of the hydraulic portion of this invention.

The inflexible tubes 52 and 54 may be divided intermediate their lengths for connection thereof to the control valve housing 66 by conventional means including screwed bushings 68. This valve housing has a pair of parallel channels 70 extending therethrough and the ends of the tubes 52 and 54 are connected by means of the bushings 68 with these channels, while a valve proper 72 is operatively associated with this valve housing, also according to conventional practice, this valve being illustrated in detail in Figure 9. If reference be had to this figure, it will be noted that the valve is preferably tapered and is provided with laterally disposed channels 74 and a pair of non-communicating, generally transverse curved or bent channels 76, adapted to interconnect diagonally of the valve portions of the channels 70, while other portions of the valve close each of the channels 70 simultaneously, as indicated at 78 in Figure 8. It will be noted that when the channels are closed by the portions 78 of the valve, the portions 80 of the channels 70 are connected through the valve channels 76 to the portions 82 of the opposite channels 70, thus reversing the flow of fluid for any given direction of movement of the piston 36, and causing the piston 58 to be moved in the opposite direction.

Remote control means for the control valve includes a valve stem 84 which is shown fluted at 86 for connection to a control lever 88 which is actuated by a piston rod 90 associated with the valve control cylinder 92. A connecting tube 94 leads from this cylinder 92 forwardly along the tongue 26 to the tractor and any suitable means either vacuumatic or hydraulic, not thought necessary to be represented in the drawings, will be provided on the tractor for causing a flow of fluid through the tube 94 into the valve control cylinder 92. A spring 96 is compressed between the piston 98 of this cylinder 92 to bias the piston in one direction, thus making it necessary to provide only simple pump means to force fluid in one direction through the tube 94 for actuation of the valve 72.

In order that fluid from the reservoir 42 may be fed through the tube 44 to the cylinder 30, thus avoiding inoperativeness due to deficiency of fluid, a one-way valve 100, illustrated in detail in Figure 7, is connected between the reservoir 42 and the pipe 44. This valve may take the form of a housing 102 with a bore 104 having a simple valve plunger of washer form 106 slidably mounted therein and biased in one direction by a spring 108 compressed between one side of the plunger 106 and the nipple 110 on one end of the housing 102, the valve plunger 106 being disposed toward the upper end of the valve housing 102 and the reservoir will ordinarily be positioned above the level of the cylinder 30, so that a gravity bead is accomplished, while preventing backflow of fluid and consequent loss of pressure.

The operation of this invention will be clearly understood from the foregoing description of the mechanical details thereof, taken in connection with the above recitation of the objects sought to be achieved by this invention.

In recapitulation, it may be added that when the tractor is being used to pull the trailer in forward direction, the control valve will normally be in the position illustrated in the right-hand portion of Figure 8, and the different elements of this invention will be arranged so that the wheels 22 will be turned in the direction illustrated in Figure 2 when the tractor is turned as indicated toward the right. Under certain conditions, however, even in forward motion, it will be desirable to have relative movement of the tractor with regard to the trailer to cause the wheels 22 to be turned in the opposite direction and this may be accomplished by actuation of the control valve 72, as described above. It will be understood that the operator of the tractor will very frequently desire to change the direction of the flow of fluid in this improved steering means when the tractor is being used to reverse the trailer, that is, to drive the trailer in a reverse direction or rearwardly. With the aid of this invention, trailers of considerable size and difficult to otherwise maneuver, may be easily handled both in forward and reverse motions.

It will be clear that all the above recited objects are amply achieved by this invention and it will be understood that this invention is not limited to the structure illustrated in the drawings which should be considered as representing only one possible embodiment of this invention.

Accordingly, protection is sought for this invention as determined by a proper interpretation of the terminology used in the subjoined claims.

Having described the invention, what is claimed as new is:

1. Steering means for a trailer having pivoted wheels and towed by a tractor, comprising a first hydraulic cylinder and a piston, one being pivoted on the trailer and the other being pivoted on the tractor, steering arms mounted on the trailer wheels, a second hydraulic cylinder mounted on the trailer and having a piston with two piston rods operatively connected to said steering arms, conduits comprising operative connection of said first cylinder with different ends of the second cylinder, whereby movement of tractor relative to said trailer will move said wheels relative to the trailer, and a valve whereby said connection of said conduits may be reversed.

2. Steering means according to claim 1 and including remote control means for said valve.

3. Steering means for a trailer having pivoted wheels and towed by a tractor, comprising a first hydraulic cylinder and a piston, one being pivoted by the trailer and the other being pivoted on the tractor, steering arms mounted on the trailer wheels, a second hydraulic cylinder mounted on the trailer and having a piston with two piston rods operatively connected to said steering arms, conduits comprising operative connection of said first cylinder with different ends of the second cylinder, whereby movement of tractor relative to said trailer will move said wheels relative to the trailer, a valve whereby said connection of said conduits may be reversed, and springs associated with the piston in said second cylinder to bias the wheels into normal position in the event of failure of another portion of the steering means.

4. Steering means according to claim 1 and wherein the piston of the first hydraulic cylinder has its piston rod pivoted on the tractor.

MILES J. SMART.
WILLIAM P. O. WOLLE.

REFERENCES CITED

The following references are of record in the file of this patent:

UNITED STATES PATENTS

| Number | Name | Date |
| --- | --- | --- |
| 1,213,440 | Wepplo | Jan. 23, 1917 |
| 2,152,511 | Vanderwerf | Mar. 28, 1939 |
| 2,174,493 | Vanderwerf | Sept. 26, 1939 |